United States Patent [19]

Grimmer

[11] Patent Number: 4,981,876

[45] Date of Patent: Jan. 1, 1991

[54] METHOD FOR SEPARATING AND RECOVERING LAYERED PLASTICS JOINED AT AN INTERFACE

[75] Inventor: Robert A. Grimmer, Berwick, Me.

[73] Assignee: Davidson Textron Inc., Dover, N.H.

[21] Appl. No.: 421,194

[22] Filed: Oct. 13, 1989

[51] Int. Cl.$^5$ .............................................. C08J 11/06
[52] U.S. Cl. .................................. 521/46.5; 521/49; 521/45; 209/173; 241/20
[58] Field of Search ................ 521/46.5, 49; 209/155, 209/162, , 173; 241/20

[56] References Cited

U.S. PATENT DOCUMENTS 4,119,533  10/1978  Saitoh et al. ........................ 209/155

FOREIGN PATENT DOCUMENTS

| 43-18478 | 8/1968 | Japan | 521/49 |
|---|---|---|---|
| 679603 | 8/1979 | U.S.S.R. | 521/49 |
| 8302281 | 7/1983 | World Int. Prop. O. | 521/46.5 |

*Primary Examiner*—Allan M. Lieberman
*Attorney, Agent, or Firm*—John C. Evans

[57] ABSTRACT

A process of separating vinyl skin from a foam backing and recovering the separated components by granulating the plastics composite into small chips, mixing the chips with a quantity of water in a vessel to swell and break the cell structure of the foam at the foam/vinyl interface resulting in flotation of the foam bits and sinking of the heavier vinyl bits. The separated foam is recovered by adding additional water to flow the foam material from the mix vessel. The vinyl is then removed from the bottom of the vessel and the separated components are dried for recycling or improved disposal purposes.

3 Claims, 1 Drawing Sheet

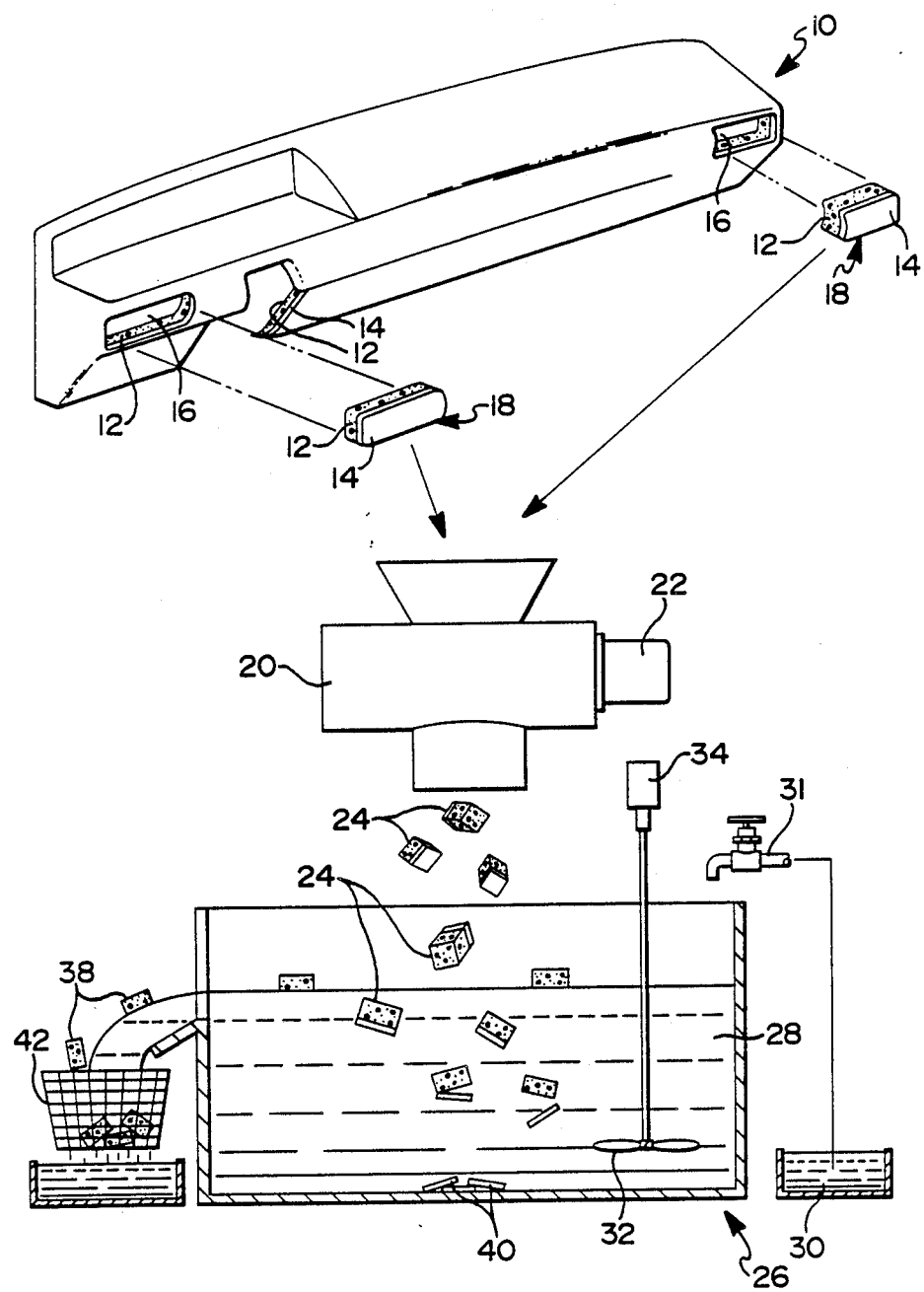

METHOD FOR SEPARATING AND RECOVERING LAYERED PLASTICS JOINED AT AN INTERFACE

BACKGROUND OF THE INVENTION (1) Field of the Invention

This invention relates to a method for separating discreet layered plastic components joined at an interface and, more particularly, to a new and improved method of separating and recovering vinyl cover stock from a urethane foam backing.

(2) Description of Prior Art

Prior to the present invention, various methods have been devised for separating the different plastics components from one another so that they could be subsequently collected and recycled.

In U.S. Pat. No. 4,602,046, a process for recovering polyester base material from scrap photographic films is disclosed in which the scrap material is cut into small chips and treated in a caustic alkali solution and under conditions of high sheer until the organic polymer coating is removed from chips of scrap to leave polyester bits. These polyester bits are then rinsed in water, dried and recycled.

In U.S. Pat. No. 4,119,533, granules of one highly hydrophobic plastic material loosely combined with granules of a different, highly hydrophobic plastic material may be separated by mixing the granules with water in a flotation separation vessel and continuously stirring the mixture. The granules of one plastic material having a higher degree of hydrophobicity than the granules of the other plastics material float onto the surface of the swirling medium and are thus separated from the other granules in the vessel so they can be removed and recycled.

SUMMARY OF THE INVENTION

The present invention is somewhat similar to the disclosures of the prior art cited above, but further provides a new and improved method in which components of a plastic composite are physically separated at an adhering interface by their inherent ability to absorb water at different rates. The absorbed water effects relative swelling of one component relative to the other resulting in shearing of the components at their interfaces. The separated components of the original composite are readily collected from a flotation vessel since the components have differing flotation characteristics.

More particularly, the present invention is drawn to a new and improved process which includes the fragmentation of a composite plastics material into homologous chips and then mixing the chips in water to swell one component part relative to the other at an interface to separate each chip into individual bits. For example, chips of urethane foam with vinyl skins are separated by their relative swelling so that the vinyl having high density will sink while the urethane foam bits float to the surface of the separation vessel. The foam bits can then be floated off or skimmed from the surface of the liquid and collected. The vinyl bits can be easily collected from the bottom of the mix vessel, removed, dried and recycled. Accordingly, with this invention, there is a simultaneous separation of plastic components such as polyvinyl chloride (PVC) and polyurethane foam into discrete layers to facilitate collection.

A feature, object and advantage of this invention is to provide a new and improved process for separating the components of a composite plastic material by the step of granule or chip formation, water mixing to swell and break the interface cells of the chips of the material into discrete bits, followed by respective separation by flotation and sinking of the bits of different plastics material in the mixing vessel.

Another feature, object and advantage of this invention is to provide a new and improved method for recycling composite plastic products having a plastic foam body and a skin of vinyl affixed thereto, comprising the steps of granulating the composite plastic product into a plurality of individual chips each having a main body part and a skin covering, placing the granulated chips into a container, subsequently adding sufficient water to the container to effect the swelling of the main body part relative to the skin covering and the subsequent separation of the chips into different discrete plastic parts.

DESCRIPTION OF THE DRAWING

The Figure is a flow chart illustrating the recovery of plastic components from waste areas of a vehicle instrument panel.

DETAILED DESCRIPTION OF THE INVENTION

The Figure shows a molded automotive instrument panel 10 having a hydrophilic part such as polyurethane foam backing 12 and a part having a high degree of hydrophobicity such as an exterior skin 14 of polyvinyl chloride integrally joined thereto at an interface. The panel has cut out areas 16 for gages, radios, and air vents. Blocks 18 of polyurethane/vinyl composite are produced from the formation of the cut out areas 10.

These waste blocks 18 are fed into a shredder or granulator 20 powered by electric motor 22. By operation of the granulator 20, the blocks 18 are divided into a plurality of cube-like chips 24 of about ⅛ inch in each dimension.

The chips 24 are subsequently fed into a vessel 26 and blended with tap water 28 from source 30 discharged from a faucet 31 using a preferred ratio of 1 part chips to 7 parts water. An impeller mixer 32 driven by motor 34 is inserted into the mixing vessel 26 and rotated to blend the chips into the water to enhance the absorption of the water by the polyurethane foam. With this absorption of water, and the greater hydrophilic ability of the urethane foam relative to the hydrophobic vinyl, there is a swelling of the urethane cells at the interface between the foam and the vinyl which effects the tearing of the cells adjacent to the interface leaving an onion skin attachment of the foam to the vinyl. After about 15 minutes, the separation of polyurethane foam bits 38 from vinyl skin bits 40 has been completed, additional water is added to the vessel and blended with the mixture so that urethane foam bits are floated on the surface of the fluid. 355 micron catch screens 42 are used to strain the foam from the water and the foam is collected in a specified container, the vinyl bits 40 are removed from the bottom of the mix vessel. The recovered vinyl and foam are dried at 225° F. to evaporate the residual water from the various bits of plastic material.

Four samples were prepared to check the vinyl to foam ratio by weight with 50 grams of scrap granules and 350 grams of water being employed.

| Recovered Vinyl | Percentage Vinyl | Percentage Foam |
|---|---|---|
| | SAMPLE 1 | |
| 45.2 grams | 90.4% | 9.6% |
| | SAMPLE 2 | |
| 37.6 grams | 75.2% | 24.8% |
| | SAMPLE 3 | |
| 40.7 grams | 81.4% | 18.6% |
| | SAMPLE 4 | |
| 40.0 grams | 80.0% | 20.0% |

While the invention has been described in detail with reference to specific embodiments, it will be apparent to one skilled in the art that various changes and modifications may be made therein without departing from the spirit and scope of the invention.

What is claimed is:

1. A method of separating a composite plastic having a discrete hydrophilic part of polyurethane foam fused at an interface to another discrete part of polyvinyl chloride having a high degree of hydrophobicity, placing said composite plastic into a container, adding an aqueous liquid medium to said container to cover at least a part of said composite plastic, maintaining said liquid medium in said container so that at least a part of said liquid medium can be absorbed into said hydrophilic part to effect relative swelling of said parts to cause shearing of said parts at the interface to separate said parts from one another for collection at different areas in the aqueous liquid medium.

2. A method of separating a plastic composite formed from a discrete hydrophilic part of polyurethane foam and another discrete part of polyvinyl chloride having a high degree of hydrophobicity fused to one another at an interface, placing said composite into a container, adding an aqueous liquid medium to said container so that said hydrophilic part swells relative to said other part at the interface to separate the plastic composite into individual bits of polyurethane foam and individual bits of polyvinyl chloride at said interface.

3. A method for separating composite plastic products comprising a plastic polyurethane foam body having a skin of polyvinyl chloride affixed thereto at an interface therebetween comprising the steps of granulating the composite plastic product into a plurality of individual fragments each having a body part and a skin covering at least a portion of said body part, placing said chips into a container, subsequently adding a water into said container to effect the swelling of said polyurethane foam body relative to said polyvinyl chloride skin and the separation of said foam body from said polyvinyl chloride skin at said interface into individual bits of polyurethane foam and individual bits of polyvinyl chloride so that said foam portions float to the surface thereof and said polyvinyl chloride portions sink to the bottom of said mixing vessel, collecting said polyurethane foam particles and subsequently collecting said polyvinyl chloride particles, drying said polyurethane foam and polyvinyl chloride particles so that they can be recycled.

* * * * *